3,147,124
PROCESS FOR MAKING CHEESE
John F. Wentworth, Oaklawn, R.I., assignor to Chemical Research Laboratories of America, Inc., Lafayette, R.I., a corporation of Rhode Island
No Drawing. Filed Dec. 8, 1960, Ser. No. 74,460
2 Claims. (Cl. 99—116)

This invention relates to a process for retarding spoilage in dairy products, and more particularly to a process for increasing the shelf-life of cheeses.

Cheeses, particularly soft cheeses such as cream cheese and cottage cheese, are subject to rapid spoilage by microorganisms which contaminate the curd. Cottage cheese is particularly susceptible to this type of spoilage. Even under refrigeration, cottage cheese made by prior art methods has a shelf-life of only three to four days. A short shelf-life causes retailers to suffer frequent losses due to spoilage and, to avoid such spoilage losses, grocers maintain only a minimum stock of cottage cheese in their stores. This practice substantially increases handling costs.

Cottage cheese usually is produced by the treatment of skim-milk with an acid to precipitate curds. A coagulator, such as rennet, is often used with the acid to increase the size of the curd particles. The whey is then separated from the curd by washing with large amounts of water. It has been found that during the washing process microorganisms in the water contaminate the curd particles and cause a variety of defects in the finished product. Contamination also occurs due to air fallout when draining the curd and when removing the curd from the cheese packing machine. Such contamination may result in the total loss of a plant's output of cottage cheese.

It is a common practice today to attempt to control contamination by adding hypochlorite to the wash water before it is run into the vat of curd. This method has proven to be unsatisfactory in protecting against spoilage bacteria already in the curd and against subsequent contamination because organic matter, such as the curd itself, will neutralize the hypochlorite and render it inactive, also hypochlorites have dissolving effect upon casein, which is undesirable. Table I shows the neutralizing effect of non-fat milk solids on the germicidal properties of hypochlorite solution containing 200 p.p.m. of available chlorine. The test solution contained approximately 100 million organisms of a mixture of E. coli, S. aureus, and B. cereus, per milliliter of test solution:

Table I

Amount of non-fat milk
solids added, percent:                    Percentage kill
  0.000 _____ 100
  0.090 _____ 100
  0.180 _____  17
  0.270 _____   0
  0.360 _____   0

In view of the unsatisfactory storage properties of cheese made according to processes in use heretofore, it is an object of this invention to provide a process for making cheese which will have a long shelf-life.

Another object of this invention is to provide a method for retarding spoilage in cheese.

A further object is to extend appreciably the shelf-life of cottage cheese.

The foregoing objects and others ancillary thereto I prefer to accomplish, according to a preferred embodiment of my invention, by adding stabilized chlorine dioxide to cheese. It may be added to the milk before it is subjected to acid or it may be added to the wash water which is used to separate the whey from the curds.

Chlorine dioxide is customarily prepared in an aqueous solution since it is unstable and, under certain conditions, explosive. When in solution it is subject to rapid decomposition. Stabilizing agents, however, may be added to the chlorine dioxide solution to stabilize against decomposition so that the solution may be stored for relatively long periods of time. One method of making stabilized chlorine dioxide is described in Patent No. 2,701,781.

It has been discovered that stabilized chlorine dioxide has remarkable germicidal properties in the presence of milk. Table II shows the effect of 200 p.p.m. of stabilized chlorine dioxide in raw milk on titratable acidity and bacterial count:

Table II

| Time held at 70° F. | Control—without $ClO_2$ | | With 200 p.p.m. $ClO_2$ | |
|---|---|---|---|---|
| | Percent Acidity | Plate Count | Percent Acidity | Plate Count |
| Start | 0.15 | 30,000 | 0.15 | 30,000 |
| 1 day | 0.16 | 17,000,000 | 0.155 | 2,900,000 |
| 2 days | 0.36 | 770,000,000 | 0.17 | 11,000,000 |
| 5 days | 0.88 | 990,000,000 | 0.22 | 10,000,000 |

Table II indicates that stabilized chlorine dioxide is an effective retarding agent to the growth of bacteria in raw milk. Chlorine dioxide actually reduced the bacterial count between the second and fifth days.

It has been discovered that there is a correlation between the acidity of chlorine dioxide solution and its germicidal power. As the acidity of the solution increases, the germicidal power of chlorine dioxide increases substantially. This effect is shown in Table III by the percentage kill of a chlorine dioxide solution against *Micrococus pyogenes* var. *aureus*:

Table III

| Acidity pH | Percentage kill after varying contact times | | | | | | | |
|---|---|---|---|---|---|---|---|---|
| | 1 Min. | 5 Min. | 10 Min. | 15 Min. | 30 Min. | 1 hr. | 2 hr. | 3 hr. |
| 2.95 | 100 | 100 | 100 | 100 | 100 | 100 | 100 | 100 |
| 4.00 | 38.6 | 44.7 | 55.3 | 78.9 | 99.7 | 100 | 100 | 100 |
| 5.00 | 16.6 | 35.3 | 45.1 | 75.5 | 95.9 | 99.9 | 100 | 100 |
| 6.05 | 0 | 0 | 14.0 | 19.3 | 12.9 | 33.3 | 100 | 100 |
| 8.30 | 0 | 0 | 0 | 0 | 0 | 0 | 0 | 0 |

NOTE.—Test Method—Mueller's Macro Method; Test Organism—The Standard A.T.C.C. No. 6538 or F.D.A. #209; Germicidal tests made at 25° C.; Inoculum, within the limits of 75 to 125 million organisms per milliliter of test solution; One hundred percent kill means 99.9999 percent or more; Hydrogen ion concentration adjusted with HCl acid; Chlorine dioxide solution diluted to 100 p.p.m. with distilled water.

Chlorine dioxide has the characteristics of an effective spoilage retarding agent for cheeses. It has germicidal properties which increase as the acidity of the solution increases. It is non-toxis in dilute solutions. An additional desirable characteristic that chlorine dioxide aids the coagulation of milk when heated. Although this invention may be used to retard spoilage in all cheeses, including cream cheese, it will be described specifically as it is used to make cottage cheese resistant to spoilage. All cheeses are made by the same basic process and from the description of methods of incorporating chlorine dioxide in cottage cheese it will be apparent to one skilled in the art that the same methods may be used with other cheeses to render them spoilage resistant.

The addition of stabilized chlorine dioxide to cottage cheese is more effective than hypochlorite for increasing the shelf-life of cottage because it is not so readily inactivated by organic matter such as non-fat milk solids. There are, however, particular advantages in adding chlorine dioxide to the skim-milk rather than to the wash water.

Since stabilized chlorine dioxide is non-toxic to animals, it would be safe to add a small amount to milk which will be used to make cottage cheese. At the normal range of pH 6.4 to 6.8 for fresh milk, stabilized chlorine dioxide, as shown in Table III, would retard the growth of microorganisms to a lesser extent than at a low pH. This characteristic is particularly advantageous in making cottage cheese. It would give the acid forming organism a chance to get started in the chlorine dioxide treated skim-milk. As acid is developed by the organism, chlorine dioxide would automatically check the growth of the starter organisms. Obviously, the addition of stabilized chlorine dioxide to the milk would slow down the initial growth of the acid starter organism, but this may be overcome by adding a larger amount of starter organism or by increasing the incubation time.

There is a tendency for milk plants to pasteurize milk at temperatures above that required by public health officials, so that the time required for pasteurization may be reduced. These higher temperatures are not satisfactory for skim-milk intended for cottage cheese manufacture, because the milk will not coagulate as firmly as when lower temperatures are used. When lower pasteurization temperatures are used, however, there is a danger of inadequate bacterial destruction. The addition of stabilized chlorine dioxide to the milk would insure adequate bacterial destruction for the lower pasteurization temperatures which are necessary to obtain cottage cheese of the desired physical properties.

An additional advantage of using stabilized chlorine dioxide is that it aids the coagulation of milk when heated. Cottage cheese may be manufactured with or without the use of a coagulator, such as rennet. When no coagulator is used, the curd is formed by acid only. When a coagulator is added to the milk, the curd is formed by the action of acid and rennet and the resulting cottage cheese is called sweet-curd cottage cheese.

Cottage cheese, in accordance with the present invention, may be prepared as follows:

Skim-milk is pasteurized and a solution of stabilized chlorine dioxide is added to the pasteurized milk to form a solution containing 200 p.p.m. of stabilized chlorine dioxide. 0.5% to 5.0% of *S. lactis* starter organism and 1 ml. of rennet per 1,000 lbs. of milk are then added to the skim-milk. It is then heated to a temperature of 72° F. to 88° F. for a period of five to sixteen hours. When coagulation of the curd is complete, it is cut, cooked for 1½ to 2½ hours at 115 to 130° F., whey drained and then washed with cold water to remove the remaining whey.

As previously stated, stabilized chlorine dioxide does not decompose rapidly and can be stored for relatively long periods of time. For this reason, it is preferred in the practice of this invention. One form of stabilized chlorine dioxide is available commercially under the trademark "Dioxcide."

The range of concentration of chlorine dioxide in skim-milk which will be effective, but non-toxic, is between 100 and 300 p.p.m. Any acid which is non-toxic may be substituted for the *S. lactis* starter orgaanism to form the curd. Although rennet is desirable as a coagulating agent, it may be omitted and the curd will be formed by the action of the acid.

As an alternative method, the chlorine dioxide may be added to the wash water in a concentration ranging between 100 and 400 p.p.m. Cottage cheese is made as described above except that chlorine dioxide is not added to the skim-milk. When coagulation of the curd is complete, it is cut, heated drained and washed with cold water containing 200 p.p.m. of chlorine dioxide to remove the remaining whey.

The invention has been described as used in the process of making cottage cheese. The method of retarding spoilage according to this invention is equally applicable to other cheeses. Stabilized chlorine dioxide may be added to the milk or cream before acid is added to form the curd or it may be added by washing the curd with a chlorine dioxide solution.

I claim:

1. A process for making cheese comprising adding stabilized chlorine dioxide to milk, adding an acid to precipitate curd, and washing the curd with water to remove the whey.

2. A process for retarding spoilage in cheese comprising adding stabilized chlorine dioxide, an acid forming agent, and a coagulator, to milk, precipitating curd, and separating the whey from the curd.

References Cited in the file of this patent

UNITED STATES PATENTS

| | | |
|---|---|---|
| 2,326,132 | Fear | Aug. 10, 1943 |
| 2,546,568 | Taylor | Mar. 27, 1951 |
| 2,701,781 | Guevara | Feb. 8, 1955 |